US010374820B2

United States Patent
Subervie et al.

(10) Patent No.: US 10,374,820 B2
(45) Date of Patent: Aug. 6, 2019

(54) MANAGEMENT UNIT FOR A COMMUNICATION DEVICE

(71) Applicants: Jean Gilles Subervie, Bayonne (FR); HITECH ONE, Blagnac (FR)

(72) Inventors: Philippe Subervie, Vacquiers (FR); Jean Gilles Subervie, Bayonne (FR)

(73) Assignee: HITECH ONE, Blagnac (FR)

( * ) Notice: Subject to any disclaimer, the term of this patent is extended or adjusted under 35 U.S.C. 154(b) by 138 days.

(21) Appl. No.: 15/500,995

(22) PCT Filed: Jul. 29, 2015

(86) PCT No.: PCT/EP2015/067333
§ 371 (c)(1),
(2) Date: Feb. 1, 2017

(87) PCT Pub. No.: WO2016/016283
PCT Pub. Date: Feb. 4, 2016

(65) Prior Publication Data
US 2017/0288896 A1    Oct. 5, 2017

(30) Foreign Application Priority Data
Aug. 1, 2014 (FR) .................................. 14 57505

(51) Int. Cl.
*H04B 1/38* (2015.01)
*H04L 12/28* (2006.01)
(Continued)

(52) U.S. Cl.
CPC ........... *H04L 12/2803* (2013.01); *H04B 1/38* (2013.01); *H04B 1/3827* (2013.01); *H04B 1/40* (2013.01);
(Continued)

(58) Field of Classification Search
CPC ........... F21V 23/045; H04B 1/40; H04B 1/38; H04B 1/3827; H04W 4/80; H01Q 1/2291;
(Continued)

(56) References Cited

U.S. PATENT DOCUMENTS 8,391,924 B2 *   3/2013   Spivey ................... H02G 3/123
                                                    455/561
2009/0051551 A1   2/2009   Pham et al.
(Continued)

FOREIGN PATENT DOCUMENTS

EP          1881469 A1      1/2008
EP          1881470 A1      1/2008
(Continued)

OTHER PUBLICATIONS

International Search Report, Translation of International Search Report, Written Opinion of PCT/EP20151067333, and English Translation of the Written Opinion.

*Primary Examiner* — Rahel Guarino
(74) *Attorney, Agent, or Firm* — Joseph G. Chu; JCIP

(57) ABSTRACT

The invention relates to a management unit for a communication device. The management unit is configured to communicate via a plurality of various types of communication networks. The management unit comprises a first attachment surface, comprising first organs for removably attaching a first external module, and a second attachment surface comprising second organs for removably attaching a second external module.

8 Claims, 9 Drawing Sheets

(51) Int. Cl.
*H04B 1/3827* (2015.01)
*H04B 1/40* (2015.01)
*G08B 25/08* (2006.01)
*G08B 25/10* (2006.01)

(52) U.S. Cl.
CPC .............. *G08B 25/08* (2013.01); *G08B 25/10* (2013.01); *H04L 2012/2841* (2013.01)

(58) Field of Classification Search
CPC ... H04L 67/12; H04L 12/2814; H04L 12/282; H04L 2012/2841; H04L 2012/285; H04L 12/2803; G08B 25/08; G08B 25/10
See application file for complete search history.

(56) References Cited

U.S. PATENT DOCUMENTS

| | | |
|---|---|---|
| 2009/0214051 A1 | 8/2009 | Lockett et al. |
| 2010/0128446 A1 | 5/2010 | Dipoala |
| 2010/0177471 A1 | 7/2010 | Spivey |

FOREIGN PATENT DOCUMENTS

| | | |
|---|---|---|
| FR | 2955453 A1 | 7/2011 |
| GB | 2433172 A | 6/2007 |

\* cited by examiner

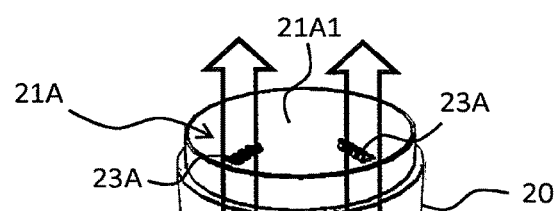
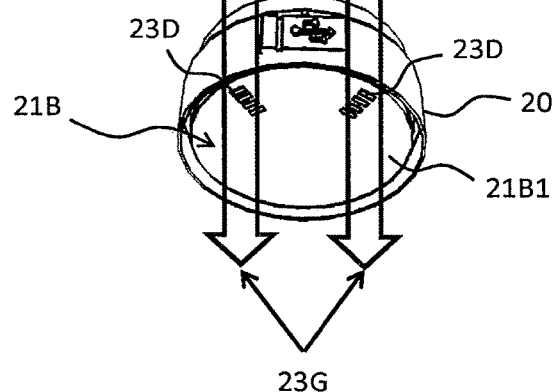
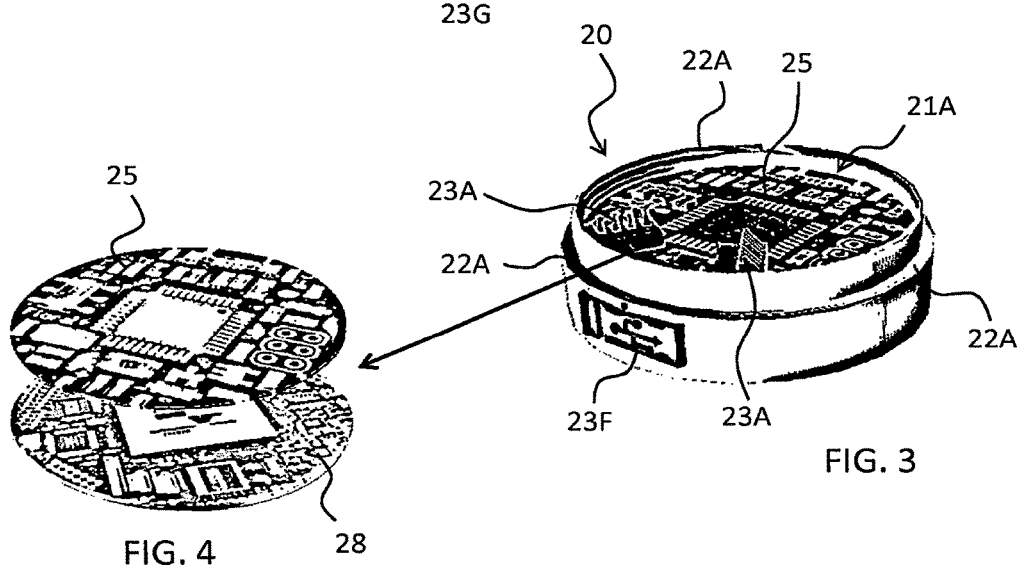

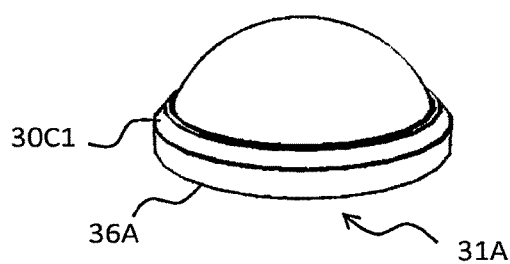
FIG. 5G
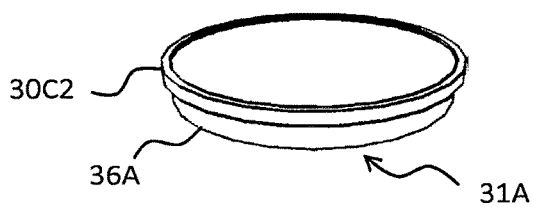
FIG. 5H
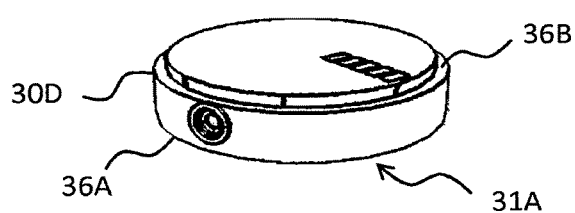
FIG. 5I
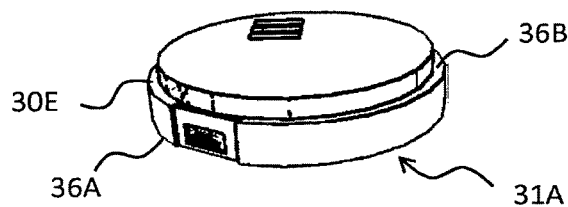
FIG. 5J
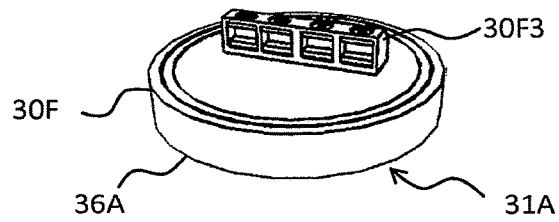
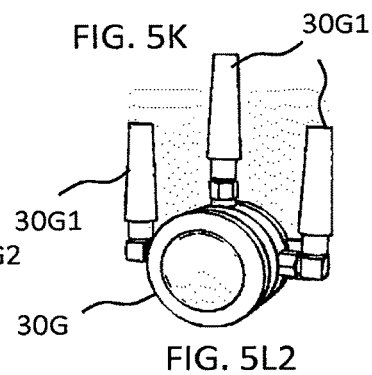
FIG. 5K
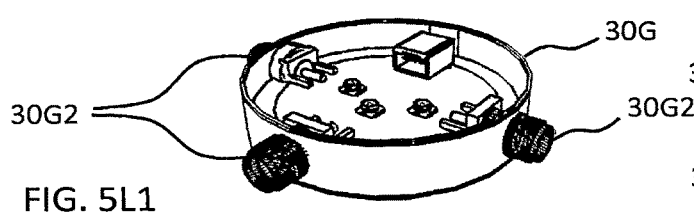
FIG. 5L1
FIG. 5L2

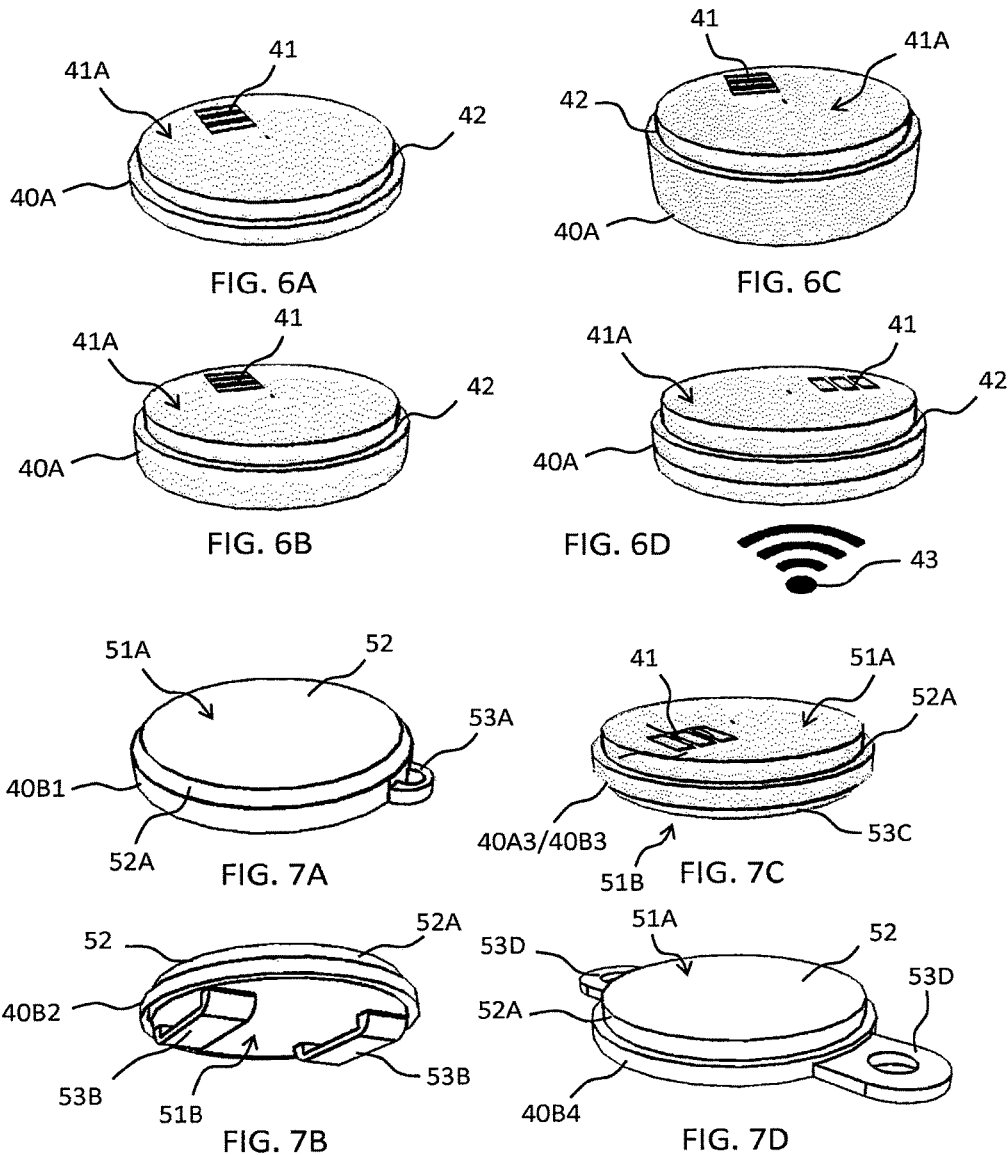

MANAGEMENT UNIT FOR A COMMUNICATION DEVICE

FIELD OF ART

This invention relates to a communication device and more particularly a management unit of such a device that can be connected to a plurality of communication networks. The invention applies in particular to the field of communicating sensors.

STATE OF THE ART

In the field of communication networks, it is known to use so-called "connected" objects that operate autonomously and send information through a communication network. Among these objects, communicating sensors are known that measure the values of parameters and send the corresponding data through a communication network.

For this purpose, these communicating sensors can be connected directly to the network or pass indirectly via an access node to the network such as, for example, a smartphone. In a known way, the data is generally sent in signals emitted over a short-range radio communication link by using a communication protocol such as, for example, Bluetooth™, Wi-Fi or Zigbee®. These sensors can be fixed or mobile and can be configured to measure the values of one or several parameters such as, for example, the heart rate or the blood pressure of a user, a temperature, a rate of humidity etc. according to their use.

Communication devices are moreover known that can be connected to one or several sensors so as to send the data measured by these sensors over one or several radio communication links associated respectively to one or several communication networks, for example 2G, 3G, 4G, Bluetooth™, Wi-Fi or Zigbee®. Such a unit comprises in a known manner a main electronic circuit and a plurality of secondary radio communication (or interface) electronic circuits. The main electronic circuit comprises a microcontroller that can be programmed to allow for both the recovery of the data coming from the sensors and the management of the plurality of secondary radio communication electronic circuits. The secondary radio communication electronic circuits each have the form of a board mounted on the main electronic circuit, with each board able to communicate with a communication network of a different type.

This type of device however has several disadvantages. First of all, its architecture is complex and expensive. In addition, it is necessary to provide on the management device a specific connector for each sensor, which limits the number and the type of sensors that can be connected to the unit. Then, adding or removing a secondary radio communication electronic board requires a disassembly of the device and the welding or the removal of said board, which can be complex, meticulous and time-consuming. Finally, the supply of this type of device is not adaptable to the application made of the device according to the type of sensor connected to the device.

The invention therefore aims to resolve at least partially these disadvantages by proposing a simple, reliable and effective solution for the communication of data transmitted by a sensor through at least one communication network.

SUMMARY

To this effect, the invention has for object a management unit for a communication device, said management unit being configured to communicate via a plurality of communication networks of different types, with the management unit being remarkable in that it includes a first attachment surface comprising a first means for attaching, removably, a first external module and a second attachment surface comprising a second means for attaching, removably, a second external module.

The terms "removably attaching" means in this document that a module can be attached on the management unit or removed from the management unit easily, for example by screwing, snap-fitting or nesting.

The management unit according to the invention is a central standard module on which may be mounted external modules of a different type. The management unit as such allows for an easy and modular assembly of a first external module and of a second external module in order to carry out different types of communication devices.

Preferably, with the management unit comprising at least two surfaces, the first attachment surface is opposite the second attachment surface so as to render the management unit and its external modules easy to assemble and to manipulate.

The first external module may be an application module, a supply module, a module for attaching of the management unit or another identical management unit.

Likewise, the second external module may be an application module, a supply module, a module for attaching of the management unit or another identical management unit.

The term "application module" means, in this document, both a module for data and/or electric current transmission or communication as well as a protective cover. Such an application module may, for example, be a measuring sensor, a measuring instrument, a radio communication module, a location module, a machine-to-machine communication module etc. Different types of application modules may therefore be advantageously mounted on the management unit, as such allowing for a plurality of different applications. By way of an application example, the application module may be a motion detector, a light detector, a camera, a video camera, a watch, an alarm, a Wi-Fi communication module, a Bluetooth™ communication module, an adapter, a cover etc.

Furthermore, a given type of supply module may advantageously be selected to be mounted on one of the attachment surfaces of the management unit according to the energy consumption of an application module that would be mounted on the other attachment surface of said management unit.

Preferably, the first means for attaching and the second means for attaching are identical in such a way as to allow for the attaching of a same external module on the first attachment surface as well as on the second attachment surface.

According to an aspect of the invention, the first attachment surface comprises a first wall, more preferably flat, comprising the first means for attaching.

According to another aspect of the invention, the second attachment surface comprises a second wall, more preferably flat, comprising the second means for attaching.

The first means for attaching and the second means for attaching may for example have the form of threaded or chamfered portions, lugs, tabs, ribs, grooves, notches, ergots being advantageously created in the first wall, respectively in the second wall, or extending from the first wall, respectively the second wall, so as to easily attach the first external module, respectively the second external module, preferably by screwing or nesting.

According to a characteristic of the invention, the management unit comprises a rigid hollow body comprising the first attachment surface and the second attachment surface and defining a volume wherein are mounted electronic components that carry out the different communication functions of said management unit with the first external module, the second external module and the plurality of communication networks. This body constitutes as such a peripheral envelope for the protection of said electronic components while still allowing for the attaching of the first external module and of the second external module.

According to a preferred aspect of the invention, the body is made from a plastic material.

According to another aspect of the invention, the body is of cylindrical shape with circular section, with the two opposite surfaces of the cylinder then respectively forming the first attachment surface of the first external module and the second attachment surface of the second external module.

According to a characteristic of the invention, the first wall comprises at least one first plurality of connectors making it possible to electrically connect the management unit to a first external module.

According to another characteristic of the invention, the second wall comprises at least one second plurality of connectors making it possible to electrically connect the management unit to a second external module.

In a preferred embodiment, the management unit comprises at least one line for both supply and communication passing through said management unit in such a way as to connect the connectors of the first plurality of connectors to the connectors of the second plurality of connectors. This line has both a supply function with electric current and a data communication bus function.

Advantageously, the management unit comprises at least one external communication sub-module connected to the supply and communication line and configured to allow for the communication, via said line, between, on the one hand, a first external module mounted on the first attachment surface and/or a second external module mounted on the second attachment surface and, on the other hand, one or several communication networks.

Preferably, the external communication sub-module comprises a plurality of radio communication units, with each radio communication until being configured to communicate via one of the networks of the plurality of communication networks. These radio communication units may, for example, be chosen from a GSM radio communication unit, a GPRS radio communication unit, a 3G radio communication unit, a 4G radio communication unit, a Wi-Fi radio communication unit, a Bluetooth™ radio communication unit, a Zigbee® radio communication unit, a GPS radio communication unit etc.

Advantageously, the external communication sub-module has the form of a single board comprising an external communication electronic circuit in such a way as to reduce the size of the management unit.

According to a characteristic of the invention, the external communication sub-module is configured to communicate with an internal communication sub-module of a second management unit.

Advantageously, the management unit may include a plurality of external communication sub-modules that operate independently of each other.

Preferably, the management unit comprises at least one internal communication sub-module connected to the supply and communication line and configured to manage via said supply and communication line, on the one hand, the external communication sub-module, and, on the other hand, the communications between the management unit and a first or a second external module mounted on one of the attachment surfaces of the management unit.

Advantageously, the internal communication sub-module may include application units such as, for example, an accelerometer, a compass-magnetometer, a gyroscope, a thermometer, a photoelectric cell for detecting day or night, a microphone, a microcontroller etc.

Advantageously, the internal communication sub-module has the form of a single board comprising an internal communication electronic circuit in order to reduce the size of the management unit.

Preferably, the board comprising the external communication electronic circuit and the board comprising the internal communication electronic circuit are mounted in a superimposed manner in the body of the management unit and are connected together by the supply and communication line. The superimposing of these two boards facilitates their connection and makes it possible to reduce the size of the management unit. Preferably, the dimensions of these boards are identical in order to simplify the architecture of the management unit.

Note furthermore that the separation of the external communication sub-module and the internal communication sub-module makes it possible to simplify the maintenance and therefore to reduce the cost of it. Indeed, the adding of a new radio communication unit requires only the changing of the external communication sub-module. Likewise, the adding of a new application unit to the internal communication sub-module or the programming of the management of the unit requires only the change of said internal communication sub-module.

The invention also relates to a communication device comprising a management unit such as presented hereinabove, a first external module removably attached on the first attachment surface of said management unit and a second external module removably attached on the second attachment surface of said management unit.

The management unit, the first external module and the second external module as such form three modular blocks that may easily be assembled to form the communication device. It is as such easy to replace one of the management unit and/or first external module and/or second external module.

Preferably, the management unit, the first external module and the second external module are superimposed, i.e. stacked on one another, so as to make it possible to easily manipulate the communication device and in particular to change one of them easily. Such a configuration furthermore makes it possible to facilitate the manufacturing, in particular the design, of the management unit, of the first external module and of the second external module. In particular, the supply and communication line may pass through the management unit in a straight way, which simplifies the architecture of the management unit as well as its utilisation.

As mentioned hereinabove, the first external module may be an application module, a supply module, a module for attaching of the management unit, a cover or another identical management unit. Likewise, the second external module may be an application module, a supply module, a module for attaching of the management unit, a cover or another identical management unit.

According to an advantageous aspect of the invention, the first external module and/or the second external module comprises a sensor and an adapter of said sensor on one of the attachment surfaces of the management unit. For example, such an adapter may have the form of a terminal block that makes it possible to provide the electrical continuity between the management unit and the sensor. As such, a sensor that is not arranged to be attached on one of the attachment surfaces of the management unit may be connected to said management unit by the intermediary of such an adaptor.

According to a preferred aspect of the invention, the first external module comprises third means for attaching complementary with the first means for attaching of the management unit.

According to another preferred aspect of the invention, the second external module comprises fourth means for attaching complementary with the second means for attaching of the management unit.

Preferably, the third means for attaching and the fourth means for attaching are identical in such a way as to independently attach the first external module and the second external module on the first attachment surface or on the second attachment surface.

In a preferred embodiment, the first external module and/or the second external module has the form of an external unit comprising at least one attachment surface on the management unit.

Advantageously, this external unit is of cylindrical shape with a circular section and with a diameter identical to that of the management unit (when the latter is of cylindrical shape with circular section) in such a way as to form an overall smooth contour, easy to assemble and to install, when it is mounted on the management unit.

Preferably, the external unit comprises a rigid hollow body mounted on the first attachment surface or the second attachment surface of the management unit and defining a volume wherein are mounted electronic components that carry out the different functions of said external unit. This body as such constitutes a peripheral envelope for the protection of said electronic components.

According to an aspect of the invention, the external unit is made from a plastic material, more preferably identical to that of the management unit.

The invention also relates to a system comprising a communication device such as shown hereinabove and a plurality of communication networks.

Other characteristics and advantages of the invention shall appear in the description which is given with respect to the annexed figures provided as non-limiting examples and wherein identical references are given to similar objects.

BRIEF DESCRIPTION OF THE DRAWINGS

FIGS. 2B, 2C and 2D respectively show a view of the first attachment surface, a side view and a view of the second attachment surface of the management unit of FIG. 2A.

FIG. 3 is a partial view in perspective and in transparency of the first attachment surface of the management unit of FIG. 2A.

FIG. 4 is a diagrammatical view of a board comprising an external communication sub-module and of a board comprising an internal communication sub-module of the management unit of FIG. 3.

FIGS. 5G and 5H show examples of application modules of the sensor type configured to be mounted on one of the receiving surfaces of a management unit according to the invention.

FIG. 5I shows an example of an application module of the video camera type configured to be attached on one of the attachment surfaces of a management unit according to the invention.

FIG. 5J shows an example of an application module of the USB port type configured to be attached on one of the attachment surfaces of a management unit according to the invention.

FIG. 5K shows an example of an adapter of the terminal block type configured to be attached on one of the attachment surfaces of a management unit according to the invention.

FIGS. 5L1 and 5L2 show at least partially an example of an external antenna adaptor configured to be attached on one of the attachment surfaces of a management unit according to the invention.

FIGS. 6A to 6D show examples of supply modules configured to be mounted on one of the attachment surfaces of a management unit according to the invention.

FIGS. 7A to 7E show examples of modules for attaching configured to be mounted on one of the attachment surfaces of a management unit according to the invention.

DETAILED DESCRIPTION

Description of an Embodiment of the System According to the Invention

Figure 1:
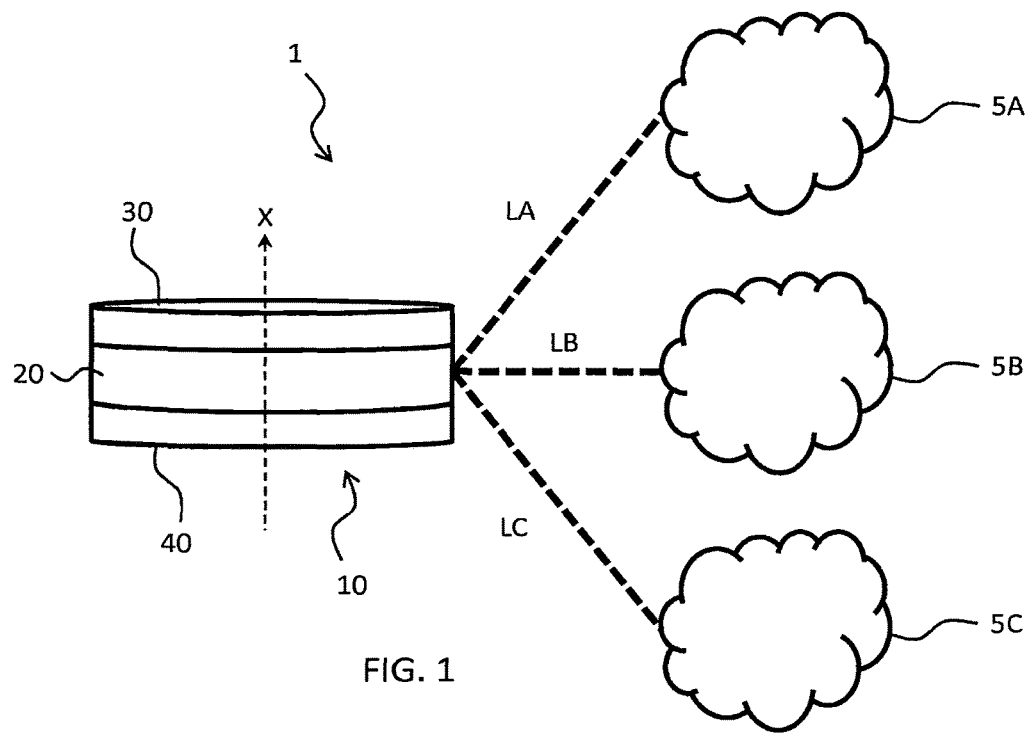
FIG. 1 shows an embodiment of the system according to the invention.

The system 1 according to the invention shown in FIG. 1 allows a communication device 10 to communicate over a plurality of radio communication links LA, LB, LC of different types with a plurality of communication networks 5A, 5B, 5C of different types.

1. System 1

In this illustrative example, the system 1 comprises three communication networks 5A, 5B, 5C of different types. This could for example be a 3G network 5A, a Wi-Fi network 5B and a Zigbee® network 5C without this limiting the scope of this invention. Indeed, it goes without saying that the system according to the invention could comprise a single network, two networks or more than three communication networks and that this communication network or networks could each be of a type other than 3G, Wi-Fi or Zigbee®.

A) Communication Device 10

Still in reference to FIG. 1, the communication device 10 according to the invention comprises a management unit 20, a first external module 30 and a second external module 40 mounted in a superimposed manner along an axis X.

According to the invention, multiple configurations of this communication device 10 are possible thanks in particular to its scalable and modular aspect, conferred in particular by the management unit 20 as explained hereinafter.

B) Management Unit 20

The management unit 20 is configured to communicate continuously, for example with a server (not shown), via each one of the three networks 5A, 56 and 5C on the communication links respectively LA, LB and LC.

Figure 2A:
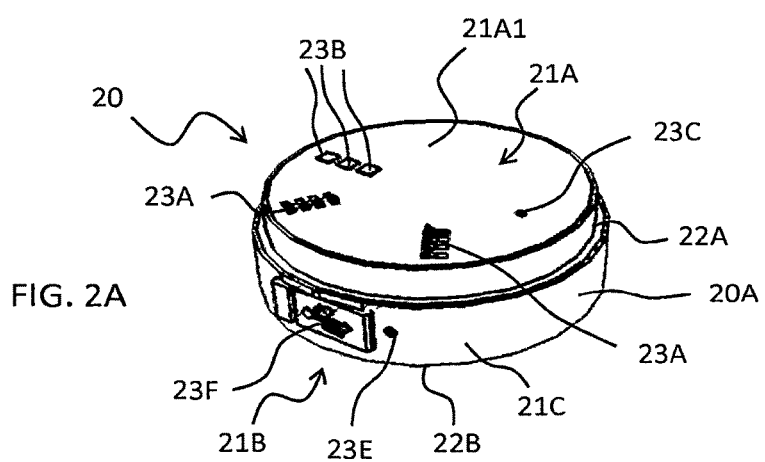
FIG. 2A is a perspective view of an embodiment of a management unit according to the invention showing its first attachment surface.

In the embodiment shown in FIG. 2A, the management unit 20 comprises a hollow rigid body 20A of cylindrical shape with circular section, more preferably made from a plastic material.

This hollow rigid body 20A defines an interior space wherein electronic components are mounted (in reference to FIGS. 3 and 4) that carry out the different communication functions of said management unit 20 with the first external module 30, the second external module 30 and the plurality of communication networks 5A, 5B 5C.

The two opposite surfaces of the cylinder respectively form a first attachment surface 21A of the first external module 30 and a second attachment surface 21B of the second external module 40 while the curved portion of the cylinder constitutes its lateral wall 21C.

In this example, the first attachment surface 21A and the second attachment surface 21B are each respectively closed by a first wall 21A1 and a second wall 21B1.

As shown in FIGS. 2A to 3, 9A and 10A to 11B, the management unit 20 comprises on its first wall 21A1 first means for attaching 22A of the first external module 30 and on the second wall 21B1 of the second means for attaching 22B of the second external module 40.

The first means for attaching 22A and the second means for attaching 22B allow for the attaching respectively of the first external module 30 and of the second external module 40 on the management unit 20 while still providing the seal of communication device 10.

The first means for attaching 22A and the second means for attaching 22B are identical in such a way as to allow for the attaching of the first external module 30 on the second attachment surface 21B and of the second external module 40 on the first attachment surface 21A.

In the examples shown in FIGS. 2A to 3 and 8A to 9A, the first means for attaching 22A and the second means for attaching 22B each have the form of a groove or circular chamfered portion created at the periphery, respectively, of the first wall 21A1 and of the second wall 21B1 and which allow respectively for the attaching of the first external module 30 and of the second external module 40 on the management unit 20 by nesting.

Figure 9A:
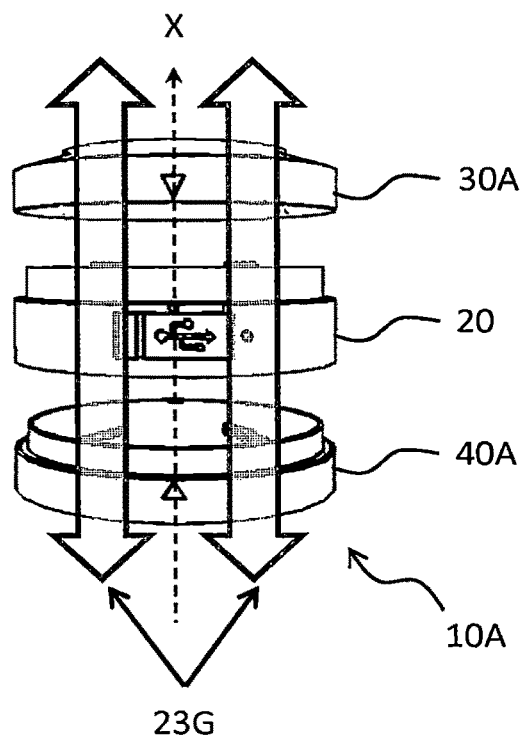
FIG. 9A is an exploded side view of the communication device of FIG. 8A.
Figure 9B:
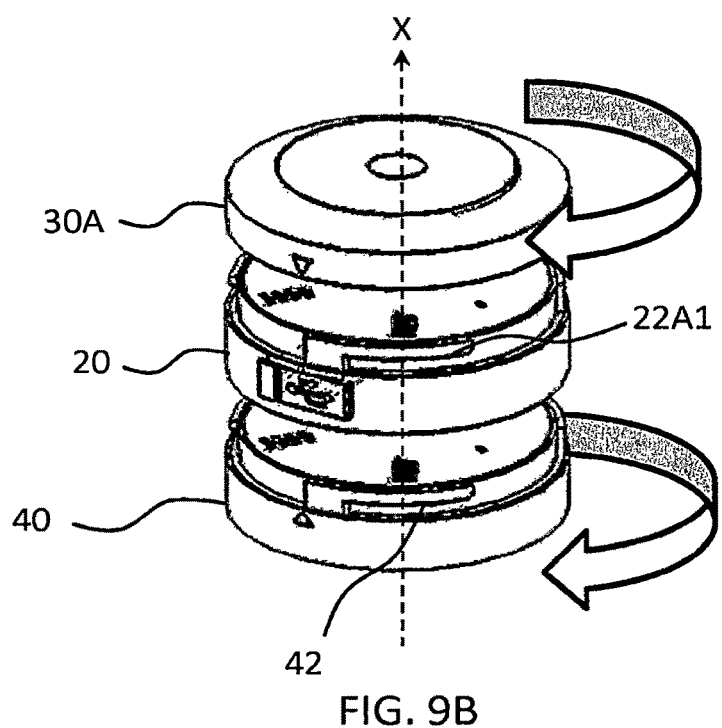
FIG. 9B is an exploded view in perspective of a fourth embodiment of the communication device according to the invention.

In the example shown in FIG. 9B, the first means for attaching 22A have the form of a circular groove created at the periphery of the first wall and comprising a threading so as to attach the first external module 30 by screwing. Likewise, the second means for attaching (not visible in this figure) have the form of a circular groove created at the periphery of the first wall and comprising a threading that is complementary with the threading of the means for attaching 42 of the second external module (in this example a supply module 40).

As an alternative or as a complement, the first means for attaching 22A and the second means for attaching 22B may include lugs, ergots or tabs in order to allow for an attaching of the first external module 30 and of the second external module 40 on the management unit 20 by snap-fitting.

In reference to FIG. 2A, the first wall 21A1 comprises two first pluralities of connectors 23A that make it possible to electrically connect the management unit 20 to the first external module 30.

The first wall 21A1 also comprises three light-emitting diodes (LED) 23B and a "reset" push-button 23C. This is not limiting in that, for specific uses, the three light-emitting diodes 23B and the push-button 23C may be mounted on the lateral wall 21C.

The three light-emitting diodes (LED) 23B are of a different colour (for example a blue diode, a green diode and a red diode) and make it possible to control the condition of the management unit 20. For example, each one of the diodes may be lit when the management unit 20 is in communication with one of the three communication networks 5A, 5B, 5C. The "reset" push-button 23C makes it possible to reset the electronics of the management unit 20.

The second wall 21B1 comprises two second pluralities of connectors 23D making it possible to electrically connect the management unit 20 to the second external module 40.

The two first pluralities of electrical connectors 23A and the two second pluralities of electrical connectors 23D are arranged symmetrically two-by-two on either side of the management unit 20.

In reference to FIGS. 2B to 2D, two lines both for the supply and communication 23G pass through the management unit 20. These two supply and communication lines are diagrammed on FIGS. 2B to 2D by double arrows 23G.

Each supply and communication line 23G connects the connectors of a first plurality of connectors 23A to the connectors of the associated second plurality of connectors 23D (i.e. arranged symmetrically with respect to the body 20A of the management unit 20).

It goes without saying that the management unit 20 according to the invention could comprise a single first plurality of connectors 23A, a single second plurality of connectors 23D and a single supply and communication line 23G connecting said first plurality of connectors 23A and the second plurality of connectors 23D.

These electrical connectors 23A, 23D may have the form of copper strips mounted on the board comprising the internal communication circuit.

These lines 23G, which may comprise a plurality of electrical wires or strands, allow for both the supply with electrical energy of the different modules and the exchanging of data between the different modules, in particular the communication between the management unit 20 and the first external module 30 and/or the second external module 40, if so needed.

Still in this example, in reference to FIG. 2A, the management unit 20 further comprises on its lateral wall 21C an audio output 23E of a microphone and a connector of the USB type 23F.

According to the invention, as shown in FIG. 4, the management unit 20 comprises an external communication sub-module 25 connected to the supply and communication lines 23G and configured to allow for the communication, via said lines 23G, on the one hand, between the first external module 30 and/or the second external module 40 and, on the other hand, one or several communication networks 5A, 5B and 5C.

The external communication sub-module 25 comprises a plurality of radio communication units (not shown), for example GPS, GPRS, 3G, Bluetooth™, Zigbee® etc., each one configured to communicate with one of the communication networks respectively 5A, 5B and 5C, in a manner known to those skilled in the art.

The external communication sub-module 25 also comprises one or several integrated antennas (not shown) allowing the radio communication units to communicate over the radio communication links LA, LB and LC.

In this example, the external communication sub-module 25 advantageously has the form of a single board comprising an external communication electronic circuit. Such a board can easily be mounted inside the hollow body 20A of the management unit 20, for example by nesting, in such a way as to be connected to the communication supply line 23G.

Advantageously, the external communication sub-module 25 is configured to communicate with an internal communication sub-module 28 of another management unit (not shown) such as shall be described hereinafter as an example in reference to FIG. 12.

The management unit 20 may comprise a plurality of external communication sub-modules 25 that operate independently of each other.

In reference now to FIG. 4, the management unit 20 comprises an internal communication sub-module 28 that has the form of a single board comprising an internal communication electronic circuit. This board is mounted inside the hollow body 20A of the management unit 20 under the board comprising the external communication electronic circuit 25 in such a way as to also be connected to the supply and communication lines 23G.

It is as such easy to replace the external communication sub-module 25 and/or the internal communication sub-module 28 by replacing one or the other of the boards. In particular, when it is necessary to communicate with a new type of communication network, it is sufficient to replace or to reprogram the board comprising the external communication electronic circuit 25.

The internal communication sub-module 28 comprises a flash memory, a microcontroller (not shown) that provides the communication, on the one hand, with the external communication sub-module 25 and, on the other hand, between the management unit 20 and the first external module 30 and/or the second external module 40 via the supply and communication lines, by using for example a protocol of the I2C, UART or SCAN type known to those skilled in the art. The internal communication sub-module 28 allows in particular for the management of the supply and the charging of batteries included in an external module 40 of the supply module type.

In this example, the internal communication sub-module 28 further comprises an application unit of the microphone type (not shown) of which the audio output 23E is shown in FIG. 2A as described hereinabove.

The internal communication sub-module 28 may also advantageously comprise other application units of the accelerometer, magnetic compass, gyroscope, thermometer, photoelectric cell etc., type. When it is desired to add a new application unit, the board comprising the internal communication electronic circuit 28 can be advantageously removed and replaced or modified (for example reprogrammed) then put back inside the hollow body 20A of the management unit without there being a need to modify the board comprising the external communication electronic circuit 25 or to change the management unit 20.

Alternatively, these application units could be implemented on a board that is separate from the board comprising the internal communication electronic circuit 28.

C) First External Module 30 and Second External Module 40

When the first means for attaching 22A of the management unit 20 and the second means for attaching 22B of the management unit 20 are identical, the first external module 30 and the second external module 40 are advantageously interchangeable.

The first external module 30 and the second external module 40 have the form of an external unit comprising at least one attachment surface 31A, 41A on the management unit 20.

The first external module 30 and the second external module 40 are configured to be removably mounted on one of the attachment surfaces 21A/21B of the management unit 20.

The attachment surface 31A, 41A of the external module 30/40 comprises respectively third and fourth means for attaching complementary with the first means for attaching 22A of the first attachment surface 21A and of the second means for attaching 22B of the second attachment surface 21B of the management unit 20.

In the examples shown in FIGS. 2A to 9A, the attachment surface of the external module 30/40 on the management unit 20 comprises a circular portion arranged in order to conform to the first wall 21A1 and to the second wall 21B1 of attaching of the management unit 20. This external unit is also preferably created in the same plastic material as that of the management unit 20.

As an alternative or as a complement, the means for attaching of the attachment surface 31A, 41A, 51A of the external module 30/40 on the management unit 20 could include a plurality of lugs or ergots 36A, 36B arranged in order to be attached on lugs or ergots complementary with an embodiment (not shown) of a management unit according to the invention.

Once mounted on the management unit 20, the first external module 30, respectively the second external module 40, is electrically connected to the management unit 20 via the plurality of connectors 23A, respectively 23D.

The first external module 30 and the second external module 40 may be one of the following external modules: an application module, a supply module, a module for attaching of the management unit or another identical management unit.

i) Application Module

An application module may be chosen according to the use that is sought of the communication device 10, in particular according to the nature of the data to be sent via the communication network or networks 5A, 5B, 5C.

FIGS. 5A to 5L show various examples of application modules. With a concern for clarity, these different application modules are shown as being first external modules 30. It goes without saying that, with the first external module 30 and the second external module 40 being interchangeable, these application modules could also be seen as second external modules 40.

Figure 5A:
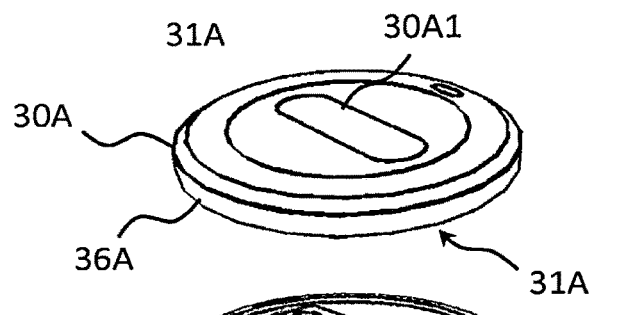
FIGS. 5A to 5D show examples of application modules of the instrument type configured to be mounted on one of the attachment surfaces of a management unit according to the invention.

FIG. 5A shows a location module 30A comprising a button that can be pressed in order to automatically locate property or a person, for example using its GPS coordinates.

Figure 5B:
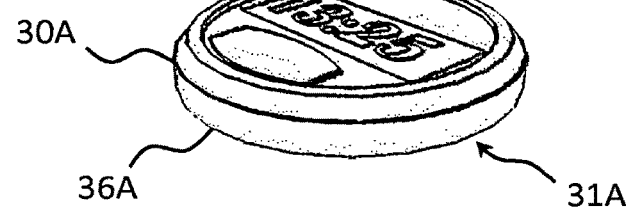

FIG. 5B shows an application module 30A of the watch or alarm type.

Figure 5C:
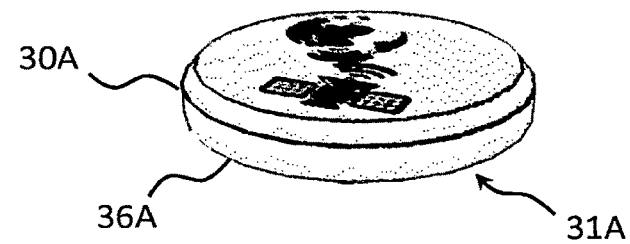

FIG. 5C shows an M2M (Machine To Machine) communication module adapted to a specific industrial environment and that uses specific communication networks. For example, several remote machines can exchange information and trigger an alarm if necessary.

Figure 5D:
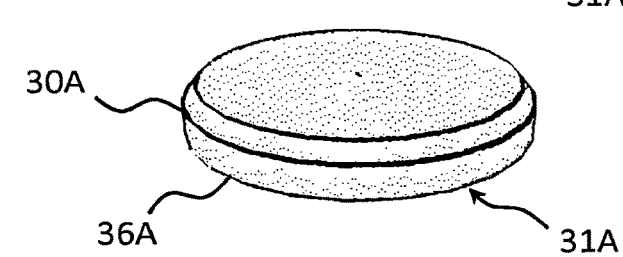

FIG. 5D shows a communication module of the Open or OEM (Original Equipment Manufacturer) type, with OEM being known to those skilled in the art. Such a module comprises a standard hollow external unit wherein are mounted electronic components of the user of the management unit 20. Any user may as such create a personalised application module according to the use that the user wants to make of the communication device 10.

Figure 5E:
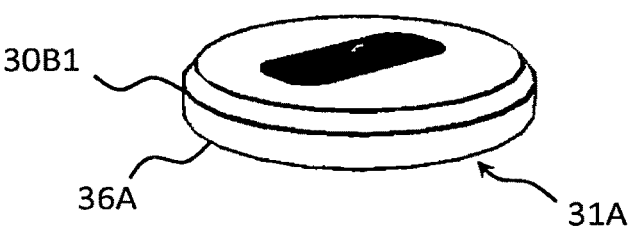
FIGS. 5E and 5F show examples of application radio communication modules configured to be mounted on one of the attachment surfaces of a management unit according to the invention.
Figure 5F:
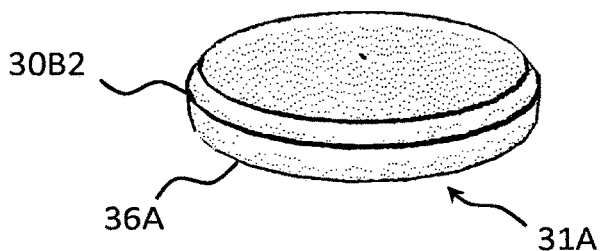

FIGS. 5E and 5F show radio communication application modules. The radio communication module 30B1 is a Wi-Fi communication module making it possible to communicate on a radio communication link of the Wi-Fi type with an entity located within the Wi-Fi coverage of the communication device 10. The radio communication module 30B2 is a Bluetooth™ or Zigbee® communication module that makes it possible to communicate over a radio communication link respectively of the Bluetooth™ or Zigbee® type with an entity located within the respectively Bluetooth™ or Zigbee® coverage of the communication device 10. Such modules may be advantageously used in order to allow two communication devices 10 to communicate between them over a wireless link, as shall be described hereinafter in reference to FIG. 12.

FIG. 5G shows a sensor of the motion detector type 30C1 which may for example be used in an alarm system of a house.

FIG. 5H shows a sensor 30C2 of the light detecting type which may for example be used in an alarm system of a house or of the photovoltaic panel type that makes it possible for example to recharge a supply module mounted on the surface opposite the management unit 20.

FIG. 5I shows an application module of the video camera type 30D. Similarly to the management unit 20, this module comprises two attachment surfaces comprising identical means for attaching 36A and 36B. With one 31A of the surfaces making it possible to attach the video camera 30E onto the management unit 20 and the opposite surface makes it possible, for example, to attach one of the detectors shown in FIGS. 5G and 5H.

FIG. 5J shows an example of a USB port module 30E that may be mounted on one of the attachment surfaces 21A/21B of the management unit 20.

FIG. 5K shows an adapter 30F of the terminal block type that makes it possible to connect to the management unit 20, for example, an application module which would not be configured to be mounted directly on said management unit 20. The adapter 30F comprises a first connection surface 30F1 comprising means for attaching on one of the attachment surfaces 21A/21B of the management unit 20 and a second connection surface 30F2 comprising means for connecting 30F3 of the input-output (I/O) connector type that make it possible, for example, to connect it to an external application module (not shown) or to a machine (not shown).

Figure 11A:
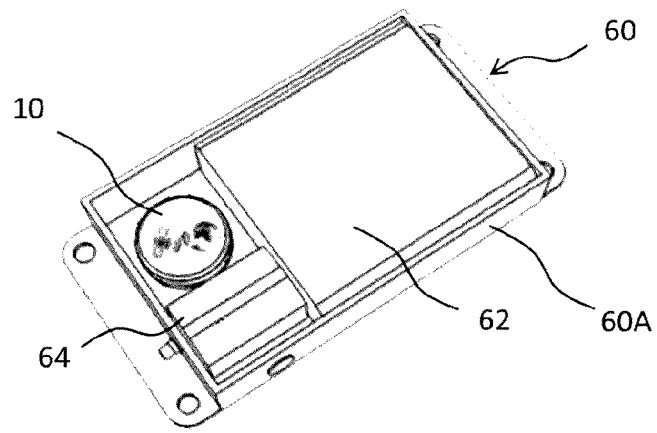
FIGS. 11A and 11B show a second example of the use of the communication device according to the invention.
Figure 11B:
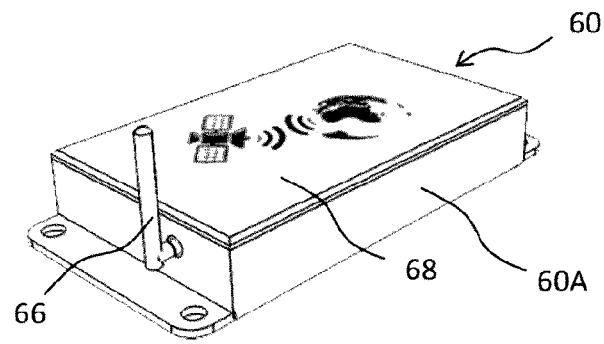

FIGS. 5L1 and 5L2 show an adapter 30G of the remote antenna type making it possible to connect to the management unit 20 external antennas 30G1, via antenna connectors 30G2, in place of the integrated antennas of the external sub-module 25, for example in order to increase the radio range of the communication device 10 or in the case of a mounting of the communication device 10 inside a metal unit as shown in the example of FIGS. 11A and 11B described hereinafter.

In another embodiment, the application module may be another type of measuring sensor, preferably, different from the application units of the internal communication sub-module 28, such as, for example, a gas detector, an analogue probe, a Geiger counter, specific terminals blocks, etc.

Figure 8A:
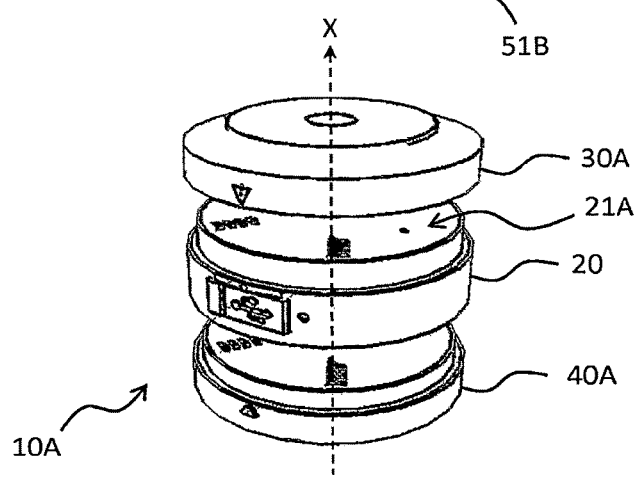
FIG. 8A is an exploded view in perspective of a first embodiment of the communication device according to the invention.
Figure 8B:
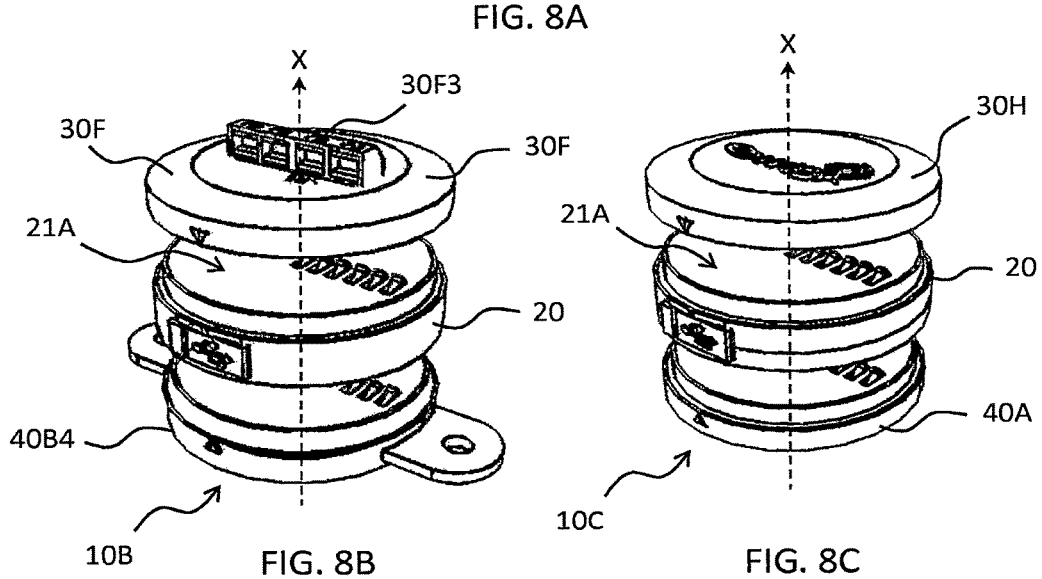
FIG. 8B is an exploded view in perspective of a second embodiment of the communication device according to the invention.
Figure 8C:
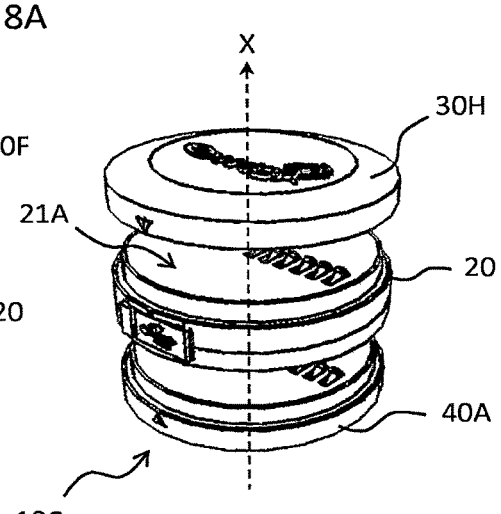
FIG. 8C is an exploded view in perspective of a third embodiment of the communication device according to the invention.

In another embodiment, the application module may be a cover 30H (in reference to FIG. 8C).

ii) Supply Module

The supply module may be mounted on one of the attachment surfaces of the management unit 20 by fourth means for attaching, complementary of the second means for attaching 22B. In the examples of FIGS. 6A to 6D, these fourth means for attaching 42 have the form of a groove or chamfered portion 42.

The supply module 40A makes it possible to supply the management unit 20 with electrical energy and, where applicable, another external module, for example an application module, mounted on the surface opposite the management unit 20.

Such a supply is carried out via the second pluralities of connectors 23D and the supply and communication lines 23G (and where applicable also via the first pluralities of connectors 23A) of the management unit 20.

For this purpose, in reference to FIGS. 6A to 6D, the supply module 40A comprises on its attachment surface 41A a third plurality of connectors 41 arranged to come into electrical contact with one of the second pluralities of connectors 23D.

Advantageously, in reference in particular to FIGS. 7C and 7E, the supply module 40A may include a second attachment surface, opposite the first attachment surface 41A in order to mount the supply module 40, for example, on a metal support via magnetization, on a support of the integrated circuit type or on a module for attaching such as shown hereinafter.

The supply module 40A advantageously has the form of a battery, for example with lithium, more preferably rechargeable.

FIGS. 6A to 6D show various examples of supply modules. With a concern for clarity, these different supply modules are shown as being second external modules 40. It goes without saying that, as the first external module 30 and the second external module 40 are interchangeable, these supply modules could also be seen as first external modules 30.

It is as such possible to mount on the management unit 20 different types of batteries, of low power, medium power or high power, according to the level of consumption of the management unit 20 and/or of the application module 30.

As such, FIG. 6A shows a low-power rechargeable battery, for example in order to ensure small missions over time, in FIG. 6B a medium-power rechargeable battery, for example for autonomies of several days, in FIG. 6C a high-power rechargeable battery, for example for an intensive use of means for locating of the GPS type, and in FIG. 6D a battery that may be recharged by contactless means of induction 43.

A supply module 40A may therefore advantageously be selected according to the use which is made of the communication device 10.

In an embodiment of the communication device 10 according to the invention, the device 10 does not include a supply module and the electrical energy may be supplied, for example, by an application module of the solar energy collector type or by an exterior supply connected to the management unit 20 by a terminal block.

iii) Attaching Module

The attaching module makes it possible to attach the communication device 10 to an external element such as a structure, a wall, a piece of clothing, a printed circuit etc.

FIGS. 7A to 7E show various examples of modules for attaching. With a concern for clarity, these different modules for attaching are shown as being second external modules 40. It goes without saying that, as the first external module 30 and the second external module 40 are interchangeable, these modules for attaching could also be seen as first external modules 30.

In reference to FIGS. 7A to 7E, the module for attaching 40B1, 40B2, 40B3, 40B4, 40B5 comprises on a first attachment surface 51A, means for attaching complementary with the means for attaching 22B of the attachment surfaces 21A/216 of the management unit 20 making it possible to attach it on the latter and means for linking 53A, 53B, 53C, 53D to an external element.

FIG. 7A shows a module for attaching 40B1 comprising a base 52 from which material comes an attachment 53A making it possible to connect the base 52, and therefore the communication device 10, to an object, for example a key ring.

Likewise, FIG. 7B shows a module for attaching 40B2 comprising a base 52 comprising, on a second attachment surface 51B, opposite the first attachment surface 51A, two pass-throughs 53B that come from the material of said base 52 and making it possible to mount the base 52, and therefore the communication device 10, on a strip of material such as, for example, a watch bracelet or a belt.

FIG. 7C shows a module for attaching 40B3 comprising on its second attachment surface 51B a magnetised portion 53C that makes it possible to attach the communication device 10 onto a metal element (not shown). In this example, the module for attaching 40B1 is also a supply module 40A3.

FIG. 7D shows a module for attaching 40B4 comprising a base 52 from which extends two ears 53D coming from the material of said base 52 and which make it possible to attach the base 52, and therefore the communication device 10, onto a wall or a structure (not shown), for example using a system of screws and nuts.

Figure 7E:
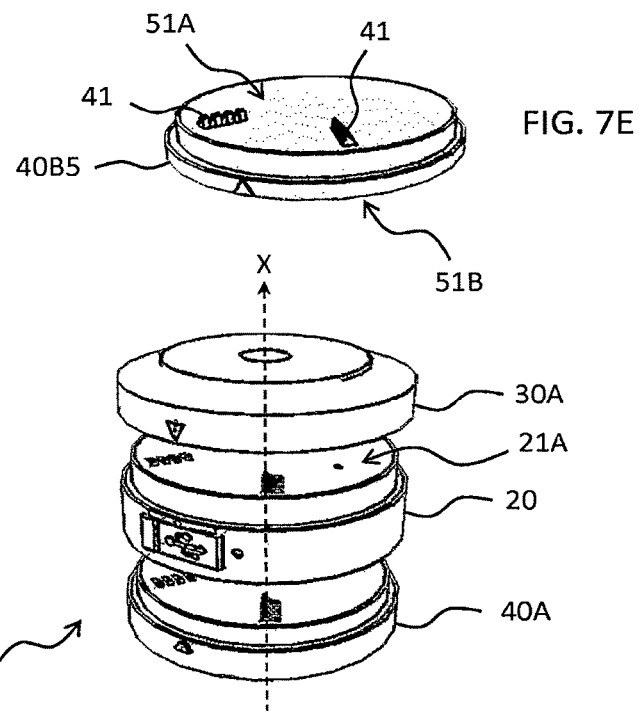

FIG. 7E shows a module for attaching 40B5 on a printed circuit 54 (in reference to FIGS. 10A and 10B), said module for attaching 40B5 comprising on its second attachment surface 51B mounting studs or pins to be welded suited for mounting on the printed circuit 54, making it possible to attach the communication device 10 to said printed circuit 54.

II. Examples of Configuration, Mounting and Use

FIGS. 8A to 8C show as an exploded view three examples 10A, 10B, 10C of a configuration of the communication device 10 according to the invention.

In reference to FIG. 8A, the communication device 10A comprises a management unit 20, a sensor 30A mounted on the first attachment surface 21A of the management unit 20 and a supply battery 40A mounted on the second attachment surface 21B of the management unit 20.

In reference to FIG. 8B, the communication device 10B comprises a management unit 20, an adapter 30F mounted on the first attachment surface 21A of the management unit 20 and a module for attaching 40B4 mounted on the second attachment surface 21B of the management unit 20.

In reference to FIG. 8C, the communication device 10A comprises a management unit 20, a cover 30H mounted on the first attachment surface 21A of the management unit 20 and a supply battery 40A mounted on the second attachment surface 21B of the management unit 20.

FIGS. 9A and 9B show types of assembly of the first external module 30 and of the second external module 40 on the management unit 20. Note in these examples that the first external module 30 may be mounted on the management unit 20 before the second external module 40 or inversely. Furthermore, when one of the external modules 30/40 is a module for attaching, note that the latter may be mounted on the management unit 20 then attached on an external element or be first attached on an external element then assembled with the management unit 20.

FIG. 9A shows the communication device 10A of FIG. 8A wherein the sensor 30A and the battery 40A are mounted on the management unit 20 by nesting, for example by force and/or using lugs or ergots, while still providing the seal of the communication device 10A. Once nested, the management unit 20, the sensor 30A and the battery 40A are connected electrically by the intermediary of the two supply and communication lines 23G passing through the management unit 20.

FIG. 9B shows the communication device 10A of FIG. 8A wherein the sensor 30A and the battery 40A are mounted on the management unit 20 by screwing, with each one of the attachment surfaces then comprising at least one threaded portion 22A1, while still providing the seal of communication device 10A. Once screwed, the management unit 20, the sensor 30A and the battery 40A are connected electrically by the intermediary of the two supply and communication lines 23G passing through the management unit 20 and are as such supplied with electrical energy while still having the possibility of exchanging data, in particular so that the sensor 30A sends data to the management unit 20 so that it communicates it via the communication network or networks 5A, 5B, 5C. In another embodiment, this data may be data received beforehand by an application module of the radio communication module type.

Figure 10A:
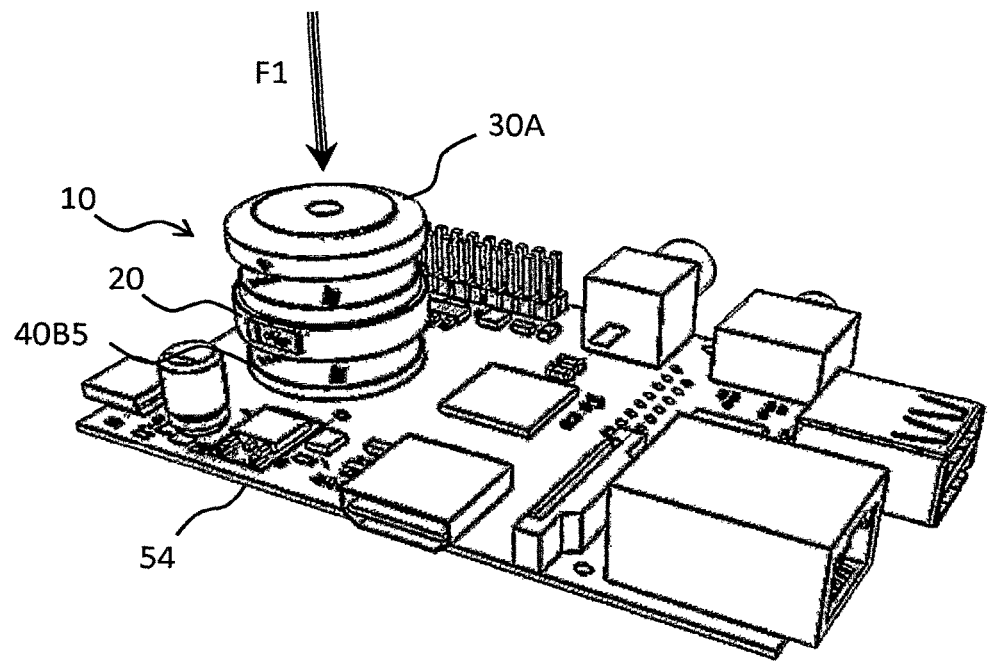
FIGS. 10A and 10B show a first example of the use of the communication device according to the invention.
Figure 10B:
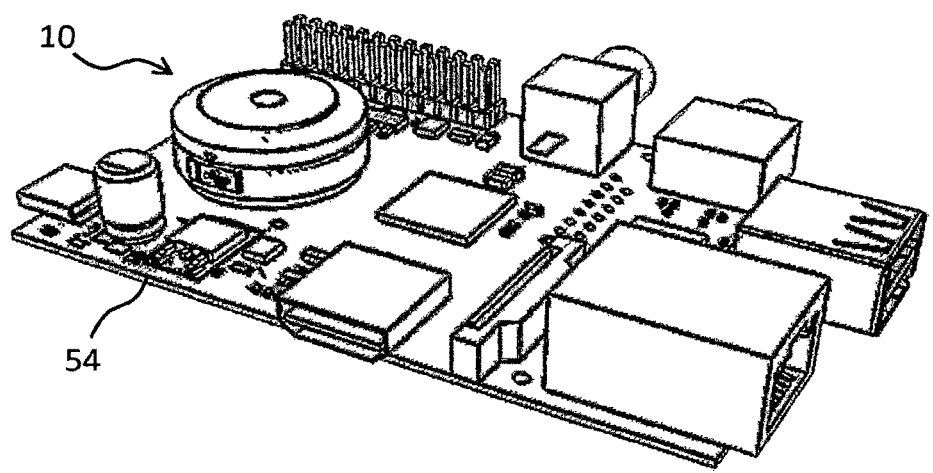

FIG. 10A shows a printed circuit 54 whereon is mounted very easily, for example by nesting or by screwing, successively: a module for attaching 40B5 (in reference to FIG. 7E) then a management unit 20 then a sensor 30A. As shown in FIG. 10B, once mounted on the printed circuit, the communication device 10 is integral with said circuit 54.

FIGS. 11A and 11B show a Wi-Fi terminal 60 with high autonomy that has the form of a metal caisson 60A wherein are mounted a communication device 10 according to the invention, a high-power battery 62, a connection module 64 and an external antenna 66.

The battery 62 allows the Wi-Fi terminal to operate for a long duration while the connection module 64 makes it possible to connect the battery 62 to the communication device 10, for example via a USB port of the management unit 20 of the communication device 10.

In this example, the external antenna 66 of the Wi-Fi terminal 60 makes it possible to communicate, for example, with a network 3G.

For this purpose, the communication device 10 comprises a management unit, a module for attaching, attached, on the one hand, to the caisson 60A and, on the other hand, to the second attachment surface of the management unit, an application module of the remote antenna type 30 (in reference to FIGS. 5L1 and 5L2) mounted on the first receiving surface of the management unit, and a cover 30H (in reference to FIG. 8C) that makes it possible to provide the seal of the communication device 10.

In this example, the Wi-Fi communications are provided by the Wi-Fi radio communication unit of the management module 20.

Such a Wi-Fi module allows a piece of user equipment, for example a smartphone or a computer, to connect via Wi-Fi radio communication link in a manner known to those skilled in the art.

Once the communication device 10 mounted on the wall of the Wi-Fi terminal and connected to the connection module 64, a cover 68 closes the Wi-Fi terminal 60 which may then be attached, for example on a wall.

Figure 12:
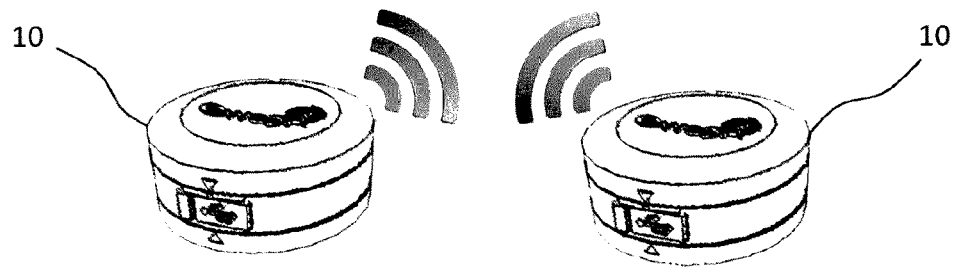
FIG. 12 shows a third example of the use of the communication device according to the invention.

In a second embodiment, FIG. 12 shows two communication devices 10 according to the invention, autonomous, that communicate directly between them without passing through a communication network.

Each one of the communication devices 10 comprises a communication application module, for example of the Wi-Fi or Bluetooth™ or Zigbee® type, and a battery mounted on the management unit.

A program stored in a memory of the management unit is executed by the microcontroller of the internal communication sub-module of each communication device 10 so that they communicate between them. The communication devices 10 begin to dialogue as soon as they are within radio coverage of each other, first of all to connect then to exchange application data of the user information type.

By way of example, the two communication devices 10 may exchange information over the carriers of the communication device 10 when they pass in the vicinity of each other, for example their name.

Note that it is possible, when the means for attaching so allow, to assemble several management units one on top of the other so as, for example, to increase the number of radio communication units and as such allow for communication with more communication networks.

Note in addition that the exchanging of data and information over the different links and communication networks may be encrypted and/or secured.

Note finally that this invention is not limited to the examples described hereinabove and is subject to many alternatives accessible to those skilled in the art. In particular, the form and the dimensions of the communication device, the type of sensor and battery as well as the nature and the type of links and communication networks such as shown in the figures in such a way as to show embodiments of the invention, must not be interpreted as limiting.

The invention claimed is:

1. A management unit for a communication device, said management unit being configured to communicate via a plurality of communication networks of different types, with the management unit being characterised in that it comprises a first attachment surface comprising first means for attaching, removably, a first external module and a second attachment surface comprising second means for attaching, removably, a second external module, wherein, the management unit comprising at least two surfaces, the first attachment surface is opposite to the second attachment surface, and wherein the first means for attaching and the second means for attaching are identical.

2. The management unit according to claim 1, wherein the first attachment surface comprises a first wall comprising the first means for attaching, the second attachment surface comprises a second wall comprising the second means for attaching, said first wall comprising at least one first plurality of connectors making it possible to electrically connect the management unit to the first external module, said second wall comprising at least one second plurality of connectors making it possible to electrically connect the management unit to the second external module.

3. The management unit according to claim 2, comprising at least one line for both supply and communication passing through said management unit in such a way as to connect the connectors of the first plurality of connectors to the connectors of the second plurality of connectors.

4. The management unit according to claim 3, comprising at least one external communication sub-module connected to the supply and communication line and configured to allow for the communication, via said line, between, on the one hand, the first external module mounted on the first attachment surface and/or the second external module mounted on the second attachment surface and, on the other hand, one or several communication networks.

5. The management unit according to claim 4, said management unit comprising at least one internal communication sub-module connected to the supply and communication line and configured to manage via said supply and communication line, on the one hand, an external communication sub-module, and, on the other hand, the communications between the management unit and the first or the second external module mounted on one of the attachment surfaces of the management unit.

6. The management unit according to claim 5, wherein the external communication sub-module has a form of a single board comprising an external communication electronic circuit and in that the internal communication sub-module has the form of a single board comprising an internal communication electronic circuit.

7. The management unit according to claim 6, said unit comprising a hollow body, with the board comprising the external communication electronic circuit and the board comprising the internal communication electronic circuit are mounted in a superimposed manner in the body of the management unit and are connected together by the supply and communication line.

8. A communication device comprising a management unit according to claim 1, the first external module removably attached on the first attachment surface of said management unit and the second external module removably attached on the second attachment surface of said management unit.

\* \* \* \* \*